United States Patent [19]
Abels

[11] Patent Number: 5,915,292
[45] Date of Patent: Jun. 22, 1999

[54] COMBAT VEHICLE WITH DIESEL-ELECTRIC DRIVE MECHANISM AND REAR HATCH

[75] Inventor: Frank O. Abels, Munster, Germany

[73] Assignee: Firma Wegman & Co. GmbH, Kassel, Germany

[21] Appl. No.: 08/914,361

[22] Filed: Aug. 19, 1997

[30] Foreign Application Priority Data

Aug. 20, 1996 [DE] Germany .................. 196 33 331

[51] Int. Cl.⁶ .................................................. F41H 7/02
[52] U.S. Cl. .................. 89/36.08; 180/65.4; 180/69.6
[58] Field of Search .................. 89/36.08, 36.07; 180/65.3, 65.4, 69.6

[56] References Cited

U.S. PATENT DOCUMENTS

| | | | |
|---|---|---|---|
| 4,492,282 | 1/1985 | Appleblatt et al. | 180/68.1 |
| 4,607,562 | 8/1986 | Le Blanc | 89/40.03 |
| 4,998,591 | 3/1991 | Zaunberger | 180/6.44 |
| 5,490,314 | 2/1996 | Riddle | 29/401.1 |

*Primary Examiner*—J. Woodrow Eldred
*Attorney, Agent, or Firm*—Sprung Kramer Schaefer & Briscoe

[57] ABSTRACT

A combat vehicle with a rear hatch and a track powered by a diesel-electric drive mechanism in the rear. It is characterized in that the drive mechanism includes separate motors that drive the tracks and several current-generating diesel-electric aggregates, each in the form of a generator powered by an automobile diesel engine. The diesel-electric aggregates are positioned symmetrically to the longitudinal axis of the vehicle and above the track cover, leaving a passage below the diesel-electric aggregates and between the inside of the vehicle and the hatch that can be heightened by moving at least part of the vehicle's floor.

6 Claims, 3 Drawing Sheets

COMBAT VEHICLE WITH DIESEL-ELECTRIC DRIVE MECHANISM AND REAR HATCH

BACKGROUND OF THE INVENTION

The present invention concerns a combat vehicle (armored troop carrier) with both a diesel-electric drive mechanism and a hatch for the riflemen in the rear.

Armored troop carriers usually have a rear hatchway to allow the troops to get in and out rapidly in a protected area. The drive mechanism is accordingly usually forward to keep the rear free for the troops and the hatchway.

Forward drive mechanisms for combat vehicles have, however, turned out to be detrimental for many reasons, and it is now considered desirable to install-such mechanisms in the rear of new models, both armored troop carriers and military tanks. Since on the other hand a hatchway at the rear remains just as unavoidably necessary for significant tactical reasons as ever, conventional drive mechanisms can no longer be considered in that the lack of space at the rear to accommodate them along with the hatchway will be immediately evident.

The Israeli armaments industry has attempted to resolve this conflict with a special type of transmission for the rear drive mechanisms employed in new models. This transmission when installed leaves room for a narrow passage between it and the wall of the vehicle. Rising about 50 cm above the bottom of this passage is a transmission tunnel that leads to the right-side drive wheel. The 60 cm of space above the tunnel is of course much too shallow to allow the troops to get in and out rapidly. To deepen the space, the Israelis have had recourse to raising the roof above the passage at the rear of the vehicle. The result is a triangular "gable" that the troops can leave the troop carrier through.

This design has several drawbacks. There is little room in spite of the elevated roof. The vehicle presents an extensive silhouette at the critical moment the troops are getting out of it and particularly at the point that is specifically at hazard. The troops have to jump over the transmission tunnel when getting in and out.

SUMMARY OF THE INVENTION

The object of the present invention is accordingly an ergonomically satisfactory and space-saving design for a combat vehicle (armored troop carrier) that will allow the troops to get in and out rapidly and easily even though the drive mechanism is not forward.

This object is attained in accordance with the present invention wherein the drive mechanism includes separate motors that drive the tracks and several current-generating diesel-electric aggregates, each in the form of a generator powered by an automobile diesel engine, whereby the diesel-electric aggregates are positioned symmetrically to the longitudinal axis of the vehicle and above the track cover, leaving a passage below the diesel-electric aggregates and between the inside of the vehicle and the hatch that can be heightened by moving at least part of the vehicle's floor.

Advantageous embodiments and advanced versions of the invention will be evident from the following disclosure.

The object of the present invention is accordingly a combat vehicle with a rear hatch and a track powered by a diesel-electric drive mechanism in the rear. It is characterized in that the drive mechanism includes separate motors that drive the tracks and several current-generating diesel-electric aggregates, each in the form of a generator powered by an automobile diesel engine, whereby the diesel-electric aggregates are positioned symmetrically to the longitudinal axis of the vehicle and above the track cover, leaving a passage below the diesel-electric aggregates and between the inside of the vehicle and the hatch that can be heightened by moving at least part of the vehicle's floor.

All the vehicle's diesel-electric aggregates can be accommodated in a housing at the rear of the vehicle, extending essentially over its whole width, and detachable from it. A section of the floor of the vehicle extending from the troop compartment to the hatch and extending partway across the vehicle can in one particular advantageous embodiment of the present invention swing down around an axis that extends horizontally across the vehicle at the front.

Many have for a long time thought about and attempted to redesign the drive mechanisms of combat vehicles on a diesel-electric basis. The point of departure has been an internal-combustion engine, preferably a diesel engine, to power a generator and distribute the resulting current over appropriate lines to motors that would drive a track. The major advantage of such a diesel-electric drive mechanism would be the possibility in accordance with the diesel-electric principle of installing separate and loose in the form of internal-combustion engines, generator, and motors the conventionally assembled components motor, transmission, and take-off that had always been integrated as a module into the vehicle and that accordingly generally dictated its dimensions, arriving at a more satisfactory utilization of the available space. The point of departure for previous approaches to diesel-electric vehicle had usually been one or no more than two engines accommodated in either the front or the rear (and sometimes at the middle). The size of these devices, however, still demanded considerable dimensions. Combat vehicles on the other hand always include a lot of corners and niches that could have provided potentially utilizable space except that they were not the right shape to accommodate large drive mechanisms. This situation suggested exploiting the space inside the vehicle better by dividing the internal-combustion engines into smaller components that could be distributed inside the vehicle where space was available.

A power of 1300 kW is obtained to drive a combat vehicle in accordance with the present invention not with a single engine but with for example ten small engines delivering 130 kW each. Such 130 kW engines are sold as automobile engines (turbodiesels) by various manufacturers. One example is the Daimler Benz OM 606 D 30 LA. These engines are small enough to be accommodated in areas inside combat vehicles that have previously been unavailable, and allow entirely new design concepts. The diesel-electric drive-mechanism theory behind the present invention also allows an electric generator to be flanged onto each engine, with their output being combined to supply motors for the tracks. In addition to the convenient spatial conditions ensured by such mechanisms there is an additional advantage of redundancy within the system. If one engine fails through either defect or damage in combat, the overall system will keep going although at decreased output. Furthermore, several small engines weigh less than a single large one and also cost less because they are manufactured in large numbers on an industrial scale.

An embodiment of the present invention will now be specified by way of example with reference to the drawings, wherein:

DETAILED DESCRIPTION OF THE INVENTION

Figure 1:
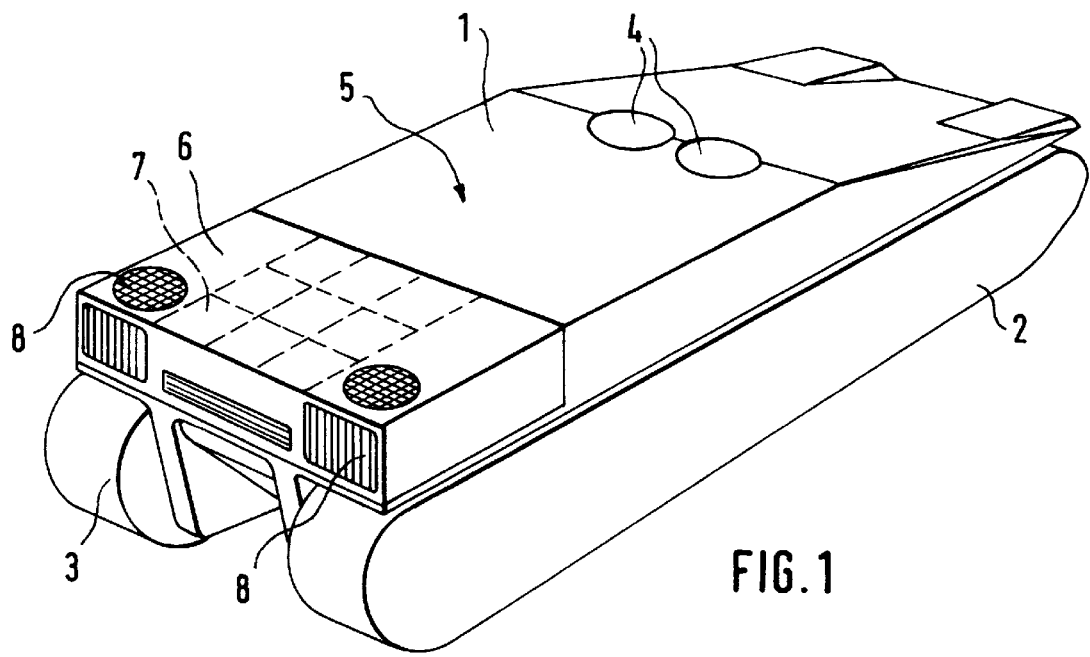
FIG. 1 is a perspective view of a combat vehicle in accordance with the present invention with its engine module in place.

The combat vehicle 1 illustrated in FIG. 1 is manned by a skeleton crew of two. The weaponry is irrelevant to the present invention and has been left out for simplicity's sake. The vehicle has a right-side track 2, a left-side track 3, hatches for a crew 4, a troop compartment sheltered by a roof 5, a module 6 with nine engines 7, and two ventilators with exhausts 8.

Figure 2:
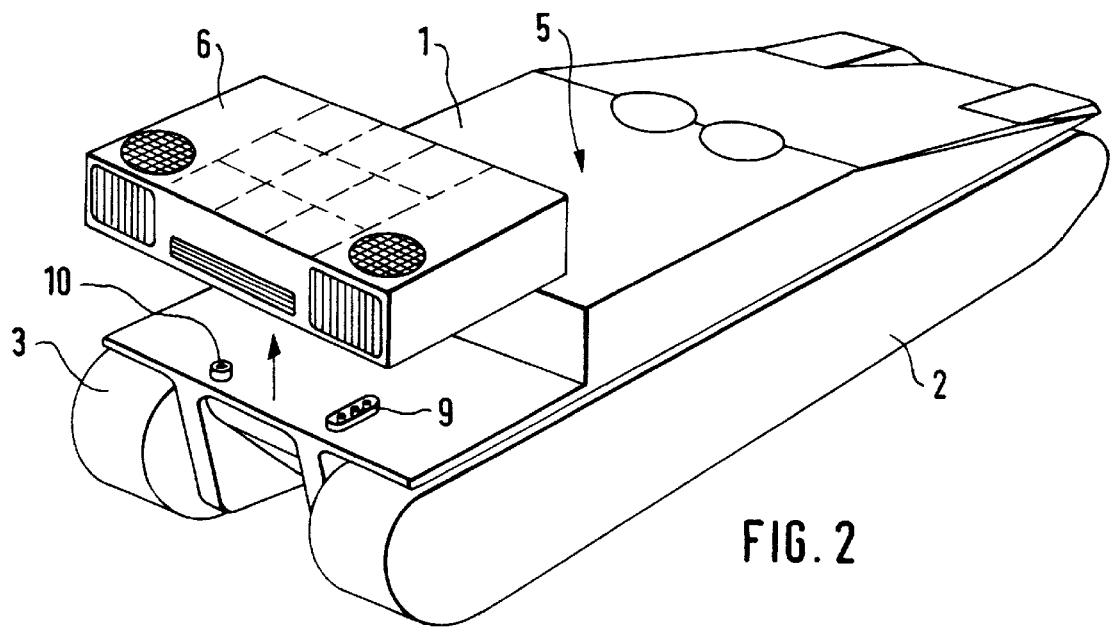
FIG. 2 is a perspective view of the same vehicle with the engine module lifted.

The engine module 6 illustrated in FIG. 2 has been lifted for maintenance and repair, revealing a power-and-control supply line 9 and a fuel intake 10.

Figure 3:
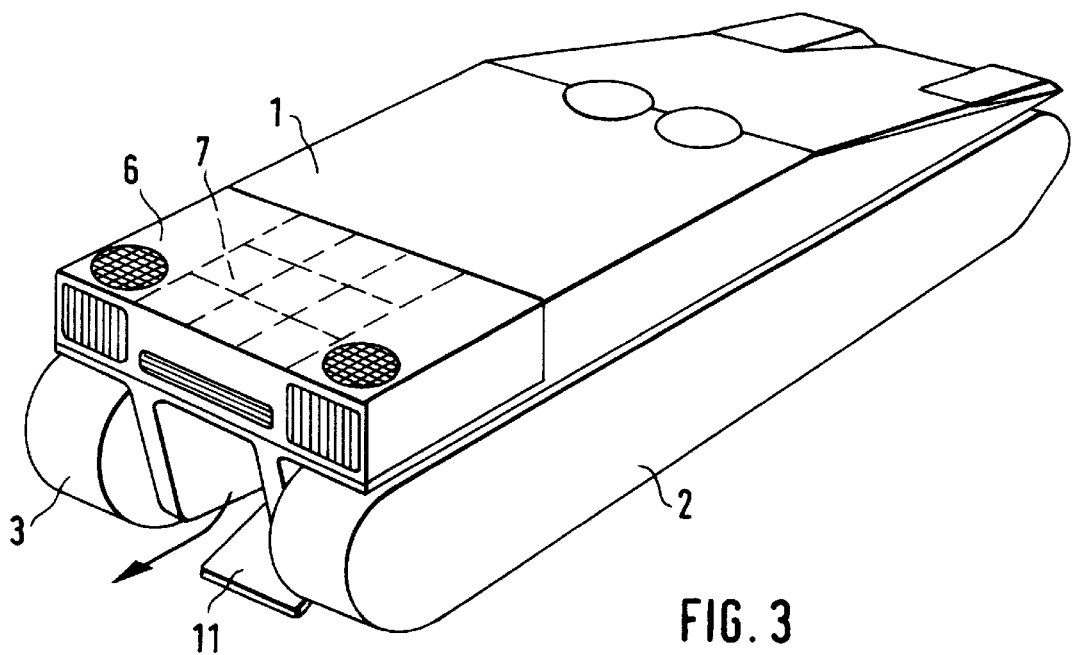
FIG. 3 is a perspective view of the vehicle with its rear hatch down.

FIG. 3 shows the aforesaid components along with a rear hatch 11 lowered to the ground to allow troops to get in and out.

Figure 4:
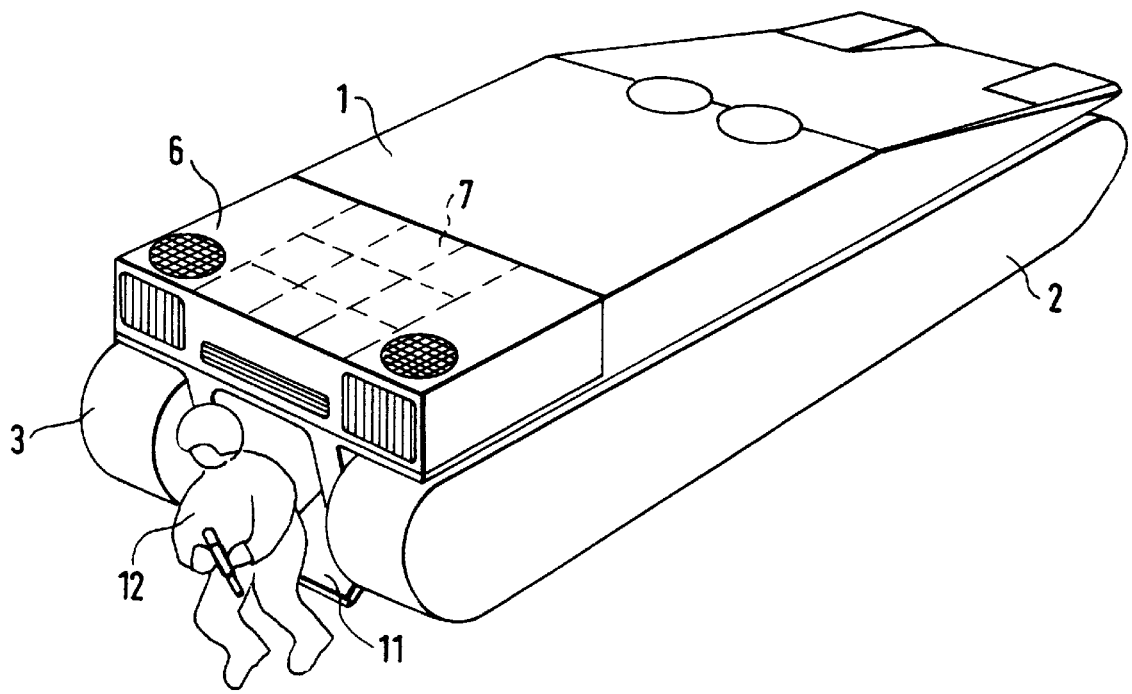
FIG. 4 is a perspective view of the vehicle with a soldier getting out.

FIG. 4 shows a soldier 12 getting out of the vehicle over rear hatch 11.

Figure 5:
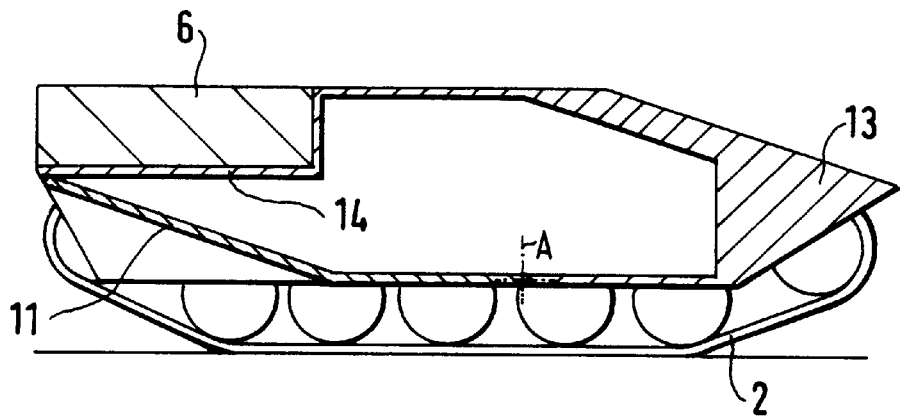
FIG. 5 is a section through the combat vehicle illustrated in FIGS. 1 through 4 in its normal state with its rear hatch up.

FIG. 5 is a schematic section through the vehicle showing engine module 6, forward anti-tank protection 13, right-side track 2, rear hatch 11, and a joint-reinforcing plate 14. Rear hatch 11 is up.

Figure 6:
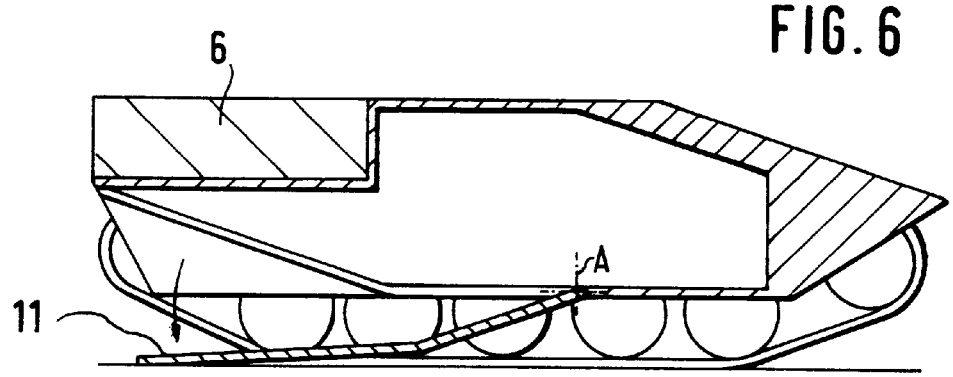
FIG. 6 is a section similar to that in FIG. 5 through the vehicle with its rear hatch down.

FIG. 6 shows rear hatch 11 resting on the ground and providing a convenient hatchway for the troops to get out of the vehicle to the rear.

Figure 7:
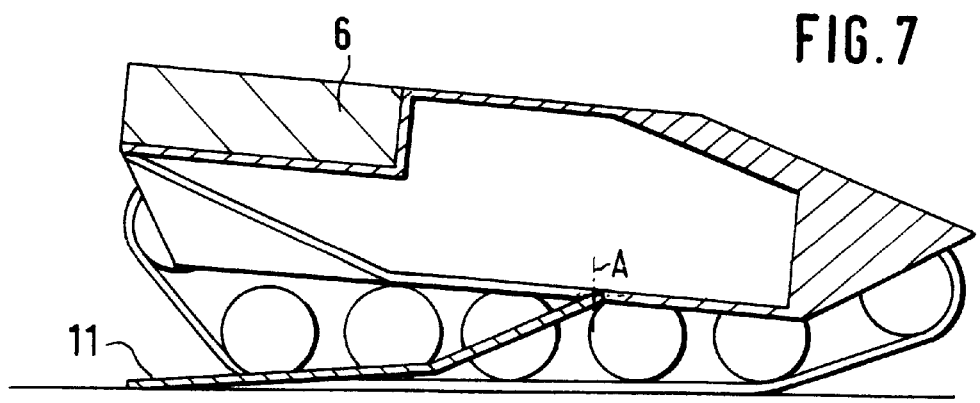
FIG. 7 is a section similar to that in FIG. 5 through the vehicle with its rear hatch down and its rear end lifted.

FIG. 7 illustrate another embodiment of the present invention whereby a hydropneumatic transmission has tilted the rear of the vehicle's body off the ground to facilitate getting off.

Vehicles in accordance with the present invention have many advantages. The hatchway is wide even though the engine modules are at the rear. Since the engine trains feature redundancy, the vehicle can travel even if one train is put out of commission by failure or damage in combat. If engines within a train fail, at least some power will still be available. Drive-mechanism components can be interchanged (due to the modular design). The capacity of the troop compartment will be large because the major mechanisms are located outside it. The vehicle will be less expensive because it employs standard automobile drive mechanisms.

What is claimed is:

1. A combat vehicle comprising: a rear portion having a rear hatch providing access to an inside of the vehicle having a floor; two tracks having track covers thereover and powered by a diesel-electric drive mechanism in the rear portion of the vehicle; wherein the drive mechanism includes a separate motor for each track and a plurality of current-generating diesel electric aggregates each comprising a generator powered by a diesel engine; wherein the plurality of diesel electric aggregates are positioned symmetrically with respect to a longitudinal axis of the vehicle and above the track covers to leave a passage below the plurality of diesel electric aggregates and between the inside of the vehicle and the rear hatch that can be heightened by moving at least part of the floor of the vehicle.

2. The combat vehicle according to claim 1, wherein the diesel engines are turbodiesel engines.

3. The combat vehicle according to claim 1, wherein the plurality of diesel electric aggregates are in a housing at the rear portion of the vehicle, wherein the housing extends over substantially the whole width of the vehicle and is detachable therefrom.

4. The combat vehicle according to claim 1, wherein the inside of the vehicle includes a troop compartment and wherein said at least part of the floor extends from the troop compartment to the rear hatch and partway across the vehicle and swings down around an axis that extends horizontally across the vehicle at a front portion of said at least part of the floor.

5. The combat vehicle according to claim 4, wherein said at least part of the floor comprises two adjacent sections joined at an obtuse angle with respect to each other.

6. The combat vehicle according to claim 4, further comprising a hydropneumatic transmission for lifting the rear portion of the vehicle.

* * * * *